(12) United States Patent
Miller

(10) Patent No.: US 10,887,338 B2
(45) Date of Patent: *Jan. 5, 2021

(54) CREATING NOTES ON LOCK SCREEN

(71) Applicant: Microsoft Technology Licensing, LLC, Redmond, WA (US)

(72) Inventor: Robert Miller, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,324

(22) Filed: Oct. 1, 2019

(65) Prior Publication Data

US 2020/0036746 A1 Jan. 30, 2020

Related U.S. Application Data

(63) Continuation of application No. 14/966,102, filed on Dec. 11, 2015, now Pat. No. 10,447,723.

(51) Int. Cl.
| | |
|---|---|
| *H04L 29/06* | (2006.01) |
| *H04W 12/12* | (2009.01) |
| *G06F 21/62* | (2013.01) |
| *G06F 16/22* | (2019.01) |
| *G06F 3/0481* | (2013.01) |
| *G06F 40/205* | (2020.01) |
| *G06F 40/279* | (2020.01) |

(Continued)

(52) U.S. Cl.
CPC ........ *H04L 63/1441* (2013.01); *G06F 3/0481* (2013.01); *G06F 3/0484* (2013.01); *G06F 16/22* (2019.01); *G06F 21/629* (2013.01); *G06F 40/205* (2020.01); *G06F 40/279* (2020.01); *H04W 12/1204* (2019.01); *H04M 1/67* (2013.01)

(58) Field of Classification Search
None
See application file for complete search history.

(56) References Cited

U.S. PATENT DOCUMENTS

| | | | |
|---|---|---|---|
| 7,233,229 B2 | 6/2007 | Stroupe et al. | |
| 7,562,241 B2 | 7/2009 | Nurmi | |

(Continued)

FOREIGN PATENT DOCUMENTS

| | | |
|---|---|---|
| CN | 102270420 A | 12/2011 |
| CN | 103577066 A | 2/2014 |
| CN | 104281375 A | 1/2015 |

OTHER PUBLICATIONS

"First Office Action Issued in Chinese Patent Application No. 201680072560.5", dated Sep. 21, 2020, 15 Pages.

*Primary Examiner* — Joseph P Hirl
*Assistant Examiner* — Hassan Saadoun
(74) *Attorney, Agent, or Firm* — Michael Best & Friedrich LLP

(57) ABSTRACT

Creating a note on a lock screen may be provided. In some examples, an application, such as a communication application, may detect an input to generate a note on a lock screen. The communication application may provide a note interface to capture the note. Next, the note may be captured on the note interface. In response, the note may be saved at a first storage location. The first storage location may be isolated by an operating system of the computing device to prevent an execution of a malicious code.

20 Claims, 8 Drawing Sheets

(51) Int. Cl.
*G06F 3/0484* (2013.01)
*H04M 1/67* (2006.01)

(56) References Cited

U.S. PATENT DOCUMENTS

| | | |
|---|---|---|
| 8,218,734 B2 | 7/2012 | Bhupati |
| 9,521,247 B2 | 12/2016 | Bandyopadhyay et al. |
| 2013/0198652 A1* | 8/2013 | Dunn ................... G06F 3/0484 715/751 |
| 2014/0223542 A1* | 8/2014 | Hicks ..................... G06F 21/45 726/16 |

* cited by examiner

US 10,887,338 B2

CREATING NOTES ON LOCK SCREEN

RELATED APPLICATIONS

This application is a continuation of and claims priority to U.S. application Ser. No. 14/966,102, filed Dec. 11, 2015, the entire content of which is incorporated by reference herein.

BACKGROUND

Mobile devices, such as cell phones and handheld game consoles, include touch screens. Mobile devices accept an input by detecting movements, known as touch gestures, of objects in contact with the touch screen. Upon detection of a touch gesture, the mobile device, or an application stored on the mobile device, may execute an action. Some mobile devices may include a lock screen to prevent unauthorized or unintentional access to the mobile device. The lock screen may regulate access to the mobile device by requiring performance of an action in order to receive access to the mobile device. Once the device is unlocked, a user can execute a functionality associated with the mobile device.

In examples, the user may wish to capture an idea quickly. To do so, the user may create sticky notes and/or start a draft communication. However, if the user is unable to access the functionality of the mobile device, the user may be unable to record the idea.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to creating a note on a lock screen. In some examples, an application, such as a communication application, may detect an input to generate a note on a lock screen. The communication application may provide a note interface to capture the note. Next, the note may be captured on the note interface. In response, the note may be saved at a first storage location. The first storage location may be isolated by an operating system of the computing device to prevent an execution of a malicious code.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
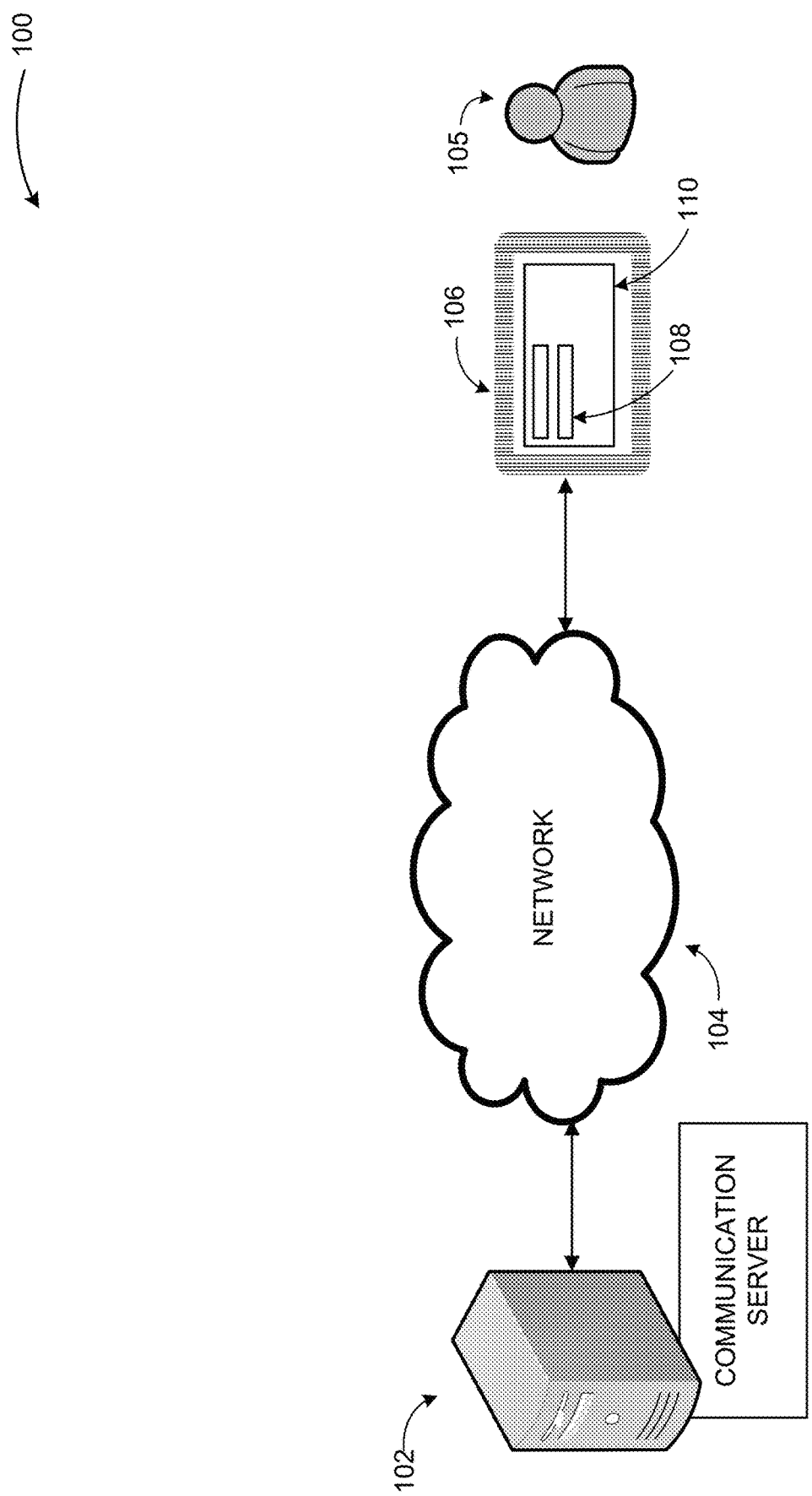
FIG. 1 is a conceptual diagram illustrating an example computing environment for creating a note on a lock screen, according to embodiments.

As briefly described above, creating a note on a lock screen may be provided. In some examples, an application, such as a communication application, may detect an input to generate a note on a lock screen. The communication application may provide, on a display device, a note interface to capture the note. The note may be captured on the note interface. The note may be saved at a first storage location. The first storage location may be isolated by an operating system of the computing device to prevent an execution of a malicious code.

The communication application may present information associated with the note. The information may include a deadline and an attachment. The information may be distinguished with a textual scheme, a graphical scheme, an audio scheme, an animation scheme, a coloring scheme, a highlighting scheme, and/or a shading scheme, among other schemes. The communication application may parse the note to detect default attributes of the note. The default attributes may include a source participant and a subject matter associated with the note, among others. The communication application may receive a transmission input detected on the lock screen to transmit the note to a second storage location. The second storage location may include a communications folder of the source participant, an email address associated with a target participant, and/or an online calendar invite associated with the target participant, among others. The note may be transmitted to the second storage location.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for creating a note on a lock screen. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using notes herein, embodiments are not limited to notes. Creating a note on a lock screen may be implemented in other environments, such as instant messages, data sharing, application sharing, online conferencing, and similar communications, where note data may be exchanged.

The technical advantages of creating a note on a lock screen may include, among others, increased efficiency of participant interactions with a computing device. Processing and network bandwidth may be reduced, as the participant may capture the note, save the note to a lock screen, and subsequently transmit the note to another destination. Further, by decreasing a number of actions performed on the computing device, memory and processor burden may be reduced.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with the notes.

FIG. 1 is a conceptual diagram illustrating an example computing environment for creating a note on a lock screen, according to embodiments.

As shown in a diagram 100, a computing device 106 may execute a communication application 108. The computing device 106 may include a display device, such as a touch enabled display component, and a monitor, among others, to provide the communication application 108 to a participant 105. The computing device 106 may include a desktop computer, a laptop computer, a tablet, a smart phone, and a wearable computer, among other similar computing devices, for example.

In some examples, the communication application 108 may be executed on a communication server 102. The communication server 102 may include a web server or a document server, among others. The computing device 106 may communicate with the communication server 102 through a network 104. The network 104 may provide wired or wireless communications between nodes, such as the computing device 106 or the communication server 102.

In other examples, the communication application 108 may be provided by a third party service, web applications, and/or a datacenter, among others. Local access to the communication application 108 may be provided by locally installed rich clients (a local version of the communication application 108) or generic applications, such as a browser on the computing device 106. The communication application 108 executed on the communication server 102 represents a visual way to view a note created by the participant 105.

The communication application 108 may detect an input on a lock screen of the computing device 106, from the participant 105, to generate a note. The lock screen may identify the computing device 106 as being in a state between a sleep state and a fully functional state. In examples, the lock screen is a user interface element used by an operating system of the computing device 106. The lock screen may be used to regulate an access to the computing device 106 by requiring the participant 105 to perform an action in order to receive the access. The action may include an input of a password, the input of a button combination, and/or the input of a gesture, among other actions. The communication application 108 may be allowed to operate in a restricted access state outside of the lock screen.

The communication application 108 may provide the note interface 110 to capture the note. The communication application 108 may capture the note on the note interface 110. The communication application 108 may save the note at a first storage location. The first storage location may be isolated by the operating system to prevent an execution of a malicious code.

The communication application 108 may present the note employing a grid of columns reflecting the state of a given note (e.g., drafted today, edited today, drafted yesterday, edited yesterday, etc.) and rows representing aggregations of summary notes. The notes may be represented by graphical objects, textual objects, or a combination of the graphical objects and the textual objects on the grid. The communication application 108 may implement various graphical, textual, coloring, shading, and similar schemes to emphasize different aspects of the notes, which may include statuses of the notes, information associated with the notes, attributes extracted from the notes, and weighted values associated with the extracted attributes, among others.

In some examples, the notes and the information, the attributes, and weighted values associated with the attributes of the notes may be presented on the note interface 110 of the computing device 106. Furthermore, conventional and intrinsic communication fields may be used for automatic placement of the notes into appropriate columns on the note interface 110.

While the example system in FIG. 1 has been described with specific components including the computing device 106, the communication application 108, and the communication server 102, embodiments are not limited to these components or system configurations and can be implemented with other system configuration employing fewer or additional components.

Figure 2:
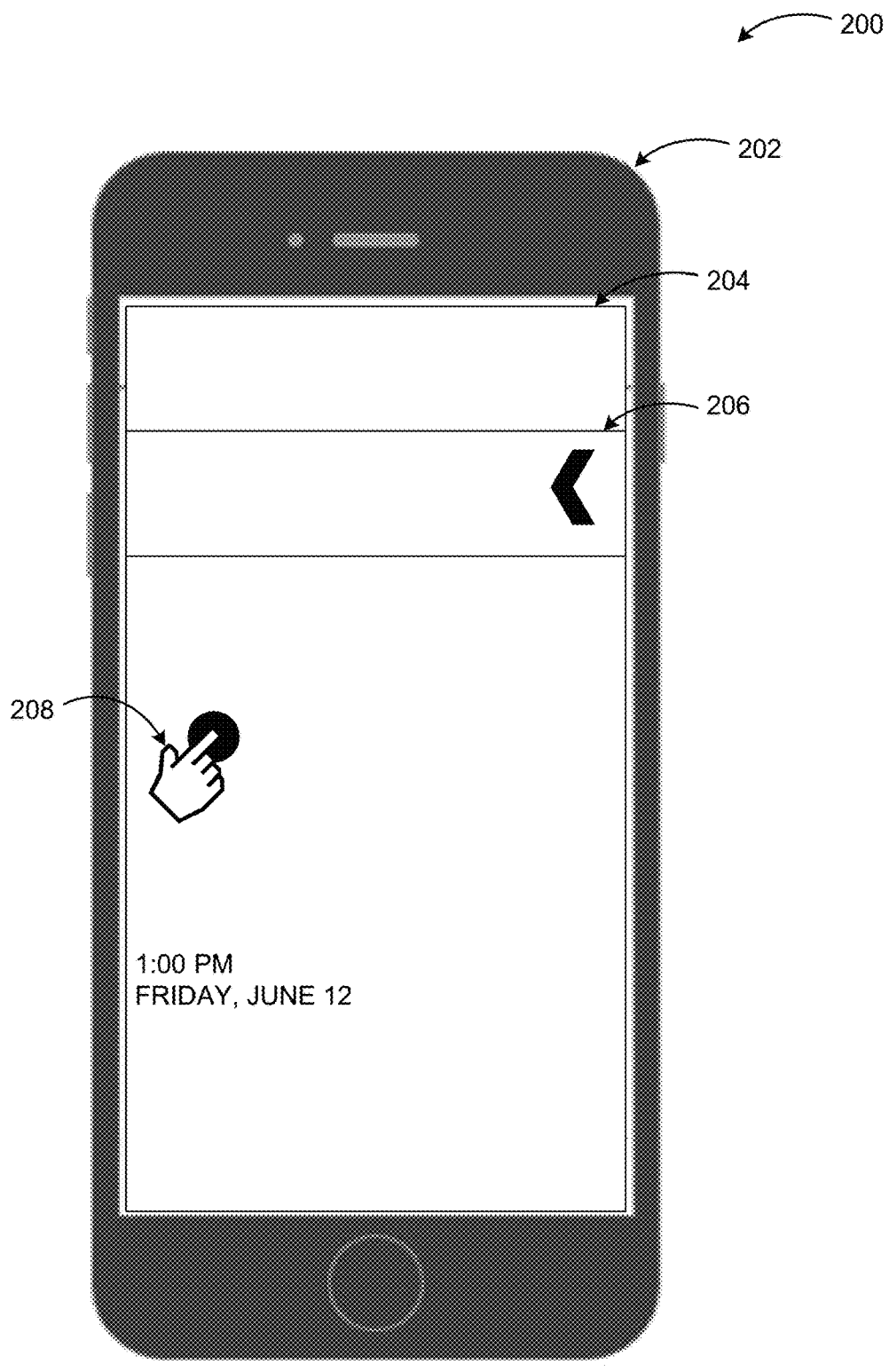
FIG. 2 is a conceptual diagram illustrating an example lock screen capable of capturing a note, according to embodiments.

FIG. 2 is a conceptual diagram illustrating an example lock screen capable of capturing a note, according to embodiments.

In a diagram 200, a computing device 202 may execute a communication application 204. The computing device 202 may provide the communication application 204 to a participant. The communication application 204 may detect an input action 208 to generate a note on a lock screen 206. The lock screen 206 may identify the computing device 202 as being in a state between a sleep state and a fully functional state. The communication application 204 may work around the lock screen 206 without defeating access restrictions to the computing device 202.

In examples, the lock screen 206 is a user interface element used by an operating system of the computing device 202. The lock screen 206 may be used to regulate an access to the computing device 202 by requiring the participant to perform an action in order to receive the access. The communication application 204 may be allowed to operate in a restricted access state outside of the lock screen 206.

In response to the detection of the input action 208, the communication application 204 may detect another input action on the lock screen 206. The other input action may include a password entered on the lock screen 206. In an alternative embodiment, the communication application 204 may receive a notification from the operating system that the attempt to unlock the lock screen 206 was successful. In response, the communication application 204 may unlock the lock screen 206. Once the computing device 202 is unlocked, the communication application 204 may automate further processing steps to save the note. The communication application 204 may also sync the note to a server associated with the computing device 202 to enable other applications to access and/or modify the note.

In other examples, in response to the detection of the input action 208, the communication application 204 may detect the other input action on the lock screen 206. The other input action may include a password entered on the lock screen 206. In other examples, the communication application 204 may receive another notification from the operating system that the attempt to unlock the lock screen 206 was unsuccessful. The other notification may include an alert to inform the participant that the lock screen 206 was not successfully unlocked. The alert may include an audio alert, a visual alert, a tactile alert, and a textual alert, among others.

Figure 3A:
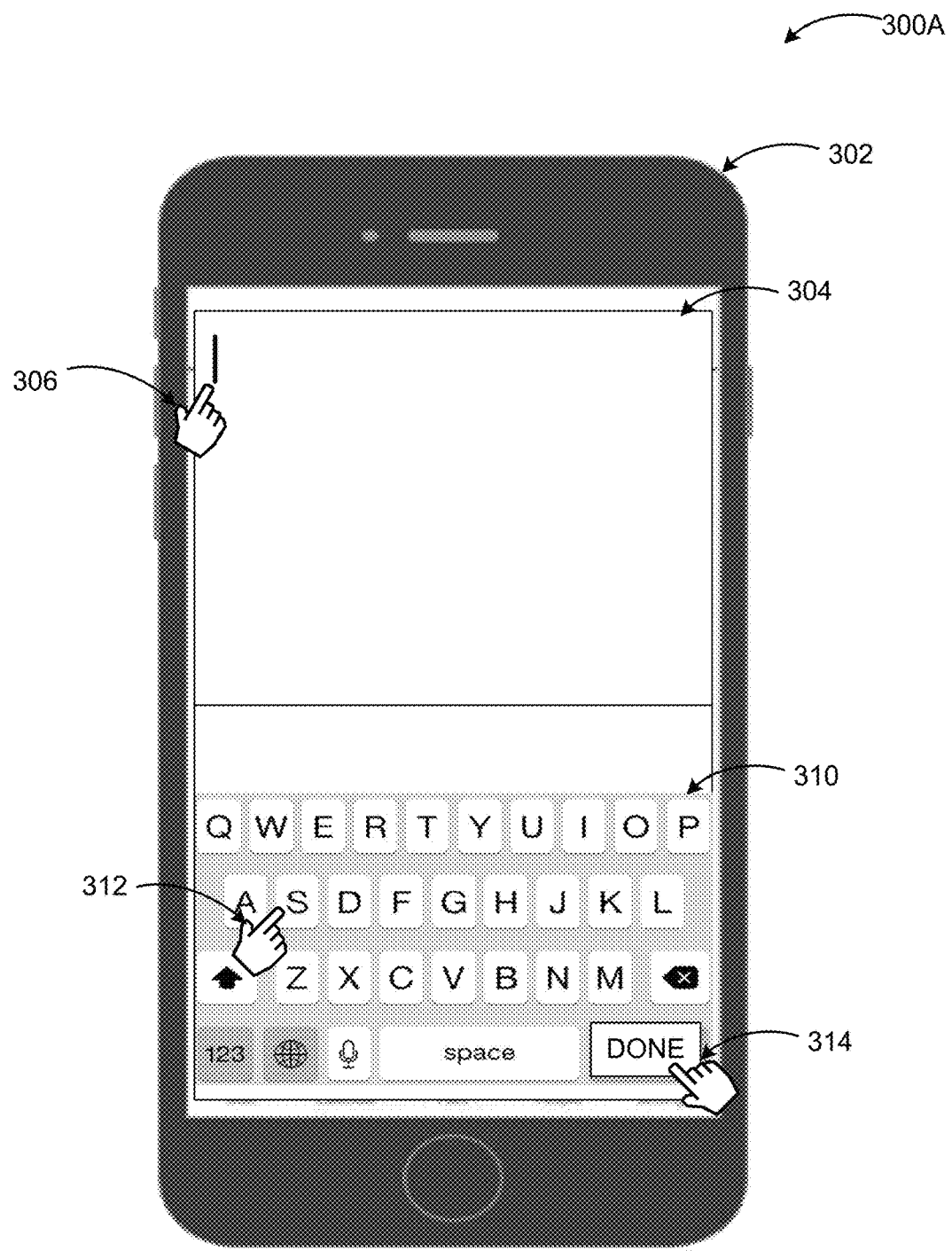
FIG. 3A is a display diagram illustrating a method to create a textual note on an example note interface, according to embodiments.

FIG. 3A is a display diagram illustrating a method to create a textual note on an example note interface, according to embodiments.

In a diagram 300A, a computing device 302 may execute a communication application. The communication application may include a rendering engine and a note modification engine, among other engines and/or modules. The communication application may detect an input action to generate a note on the lock screen. The input action may include a press and hold action, a swipe action, a keyboard entry combination, a hovering action by a mouse input, a press and hold action and a hovering action by a pen input, a tap action, an accelerometer sensor based input, an orientation sensor based input, an optically captured gesture, and/or a time based input, among others.

In response to the detection of the input action, in some alternative examples, the communication application may detect another input action on the lock screen. The other input action may include a password entered on the lock screen. The communication application may receive a notification from an operating system of the computing device 302 that the attempt to unlock the lock screen was successful. In response, the communication application may unlock the lock screen. The communication application may provide a note interface 304 to capture the note.

The communication application may detect an insertion action 306 executed on the note interface 304. In response to the detection of the insertion action 306, the communication application may display a keyboard 310 to facilitate a capture of the note. The keyboard 310 may be displayed in a location in proximity to the note interface 304. In examples, the location of the keyboard 310 may include above the note interface 304, below the note interface 304, to a left side of the note interface 304, and to a right side of the note interface 304.

Additionally, in response to the detection of the insertion action 306, the communication application may detect an entry 312 of characters on the keyboard 310. The communication application may save the entered characters in the note in response to a detection of an action 314 executed on the keyboard 310 to indicate a completion of the note. In response to capturing the note on the note interface 304, the communication application may save the note at a first storage location. The first storage location may be isolated by the operating system to prevent an execution of a malicious code.

In other examples, in response to the detection of the insertion action 306, the communication application may display an audio element (not shown). The audio element may include operations to prompt the participant to input audio files into the note. In response to receiving a confirmation input to save the note, the communication application may save the note at the first storage location.

In other examples, in response to the detection of the insertion action 306, the communication application may display an audio element (not shown). The audio element may include operations to prompt the participant to input audio files into the note. The communication application may transcribe the audio files into textual files using a dictation algorithm, dictation software, and/or additional algorithms and software. In response to receiving a confirmation input to save the note, the communication application may save the note (e.g., the textual files) at the first storage location.

In other examples, in response to the detection of the insertion action 306, the communication application may display a graphical element (not shown). The graphical element may include operations to prompt the participant to input graphical files into the note. In response to receiving a confirmation input to save the note, the communication application may save the note (e.g., the graphical files) at the first storage location.

Additionally, in response to saving the note at the first storage location, the communication application may prompt the participant to enrich the note. Example inputs to enrich the note may include, among others, attaching a graphical file to the note, adding a reminder to the note, tagging a person in the note, and adding a hashtag to the note, among others.

Figure 3B:
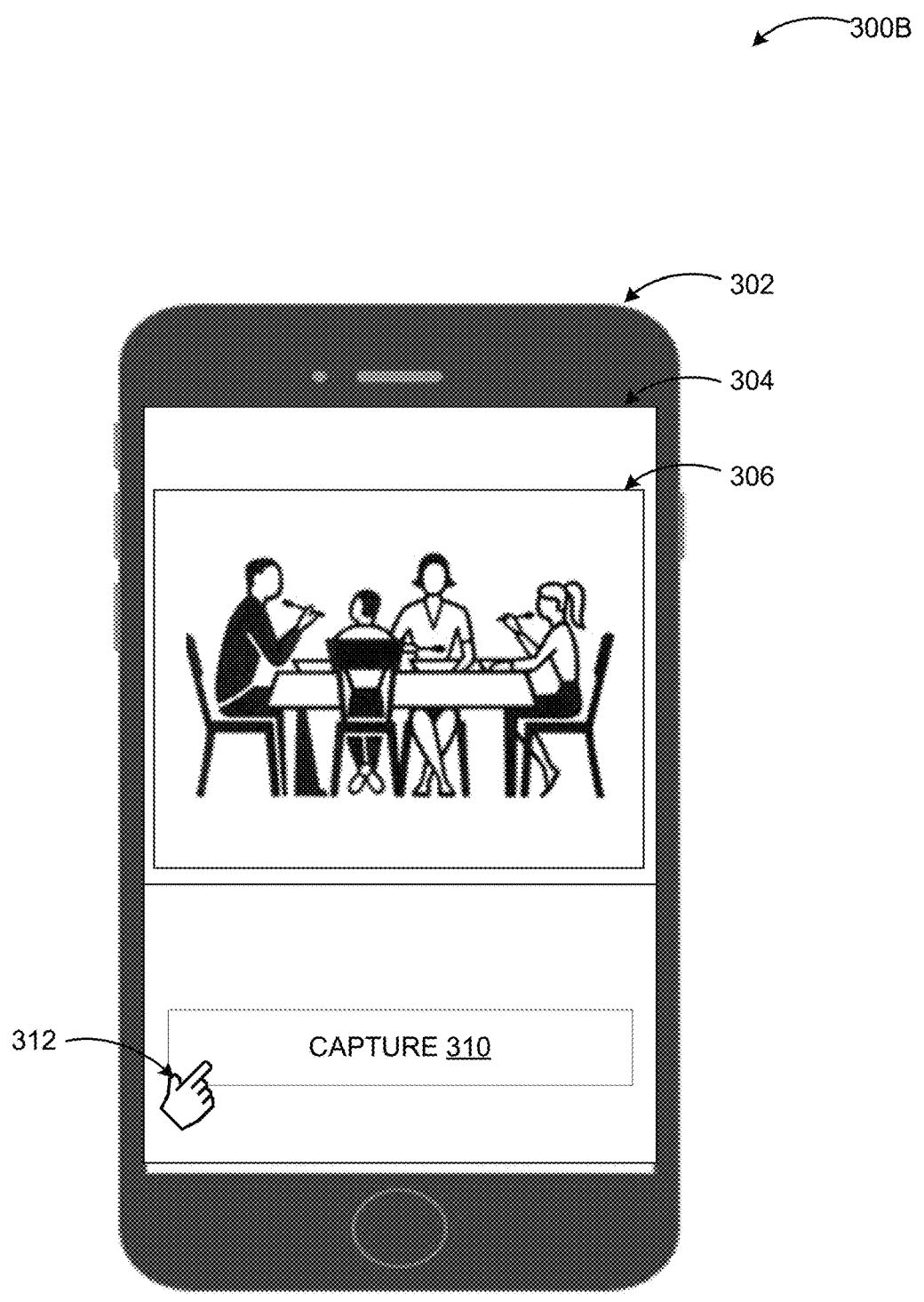
FIG. 3B is a display diagram illustrating a method to create a graphical note on an example note interface, according to embodiments.

FIG. 3B is a display diagram illustrating a method to create a graphical note on an example note interface, according to embodiments.

In a diagram 300B, a computing device 302 may execute a communication application. The computing device 302 may provide the communication application to a participant. The communication application may detect an input action to generate a note on the lock screen. In response to the detection of the input action, the communication application may detect another input action on the lock screen. The other input action may include a password entered on the lock screen. In an alternative embodiment, the communication application may receive a notification from an operating system of the computing device 302 that the attempt to unlock the lock screen was successful. In response, the communication application may unlock the lock screen. The communication application may provide a note interface 304 to capture the note.

The communication application may display a screen 306 on the note interface 304 to capture the note. In other examples, the screen 306 may be located in a proximity to the note interface 304. The communication application may detect an input action 312 executed on a capture button 310 on the note interface 304.

In response to the detection of the input action 312, the communication application may utilize a camera of the computing device 302 to capture a graphical image, audio, and/or a video of objects present in the screen 306. The communication application may save the graphical image, the audio, and/or the video as a note at a first storage location. The first storage location may be isolated by the operating system to prevent an execution of a malicious code. In other examples, the note may include stereoscopic displays, simulations, and sensory information. The note may further may include a virtual reality and/or an augmented reality of the graphical image, the audio, and/or the video.

Figure 4:
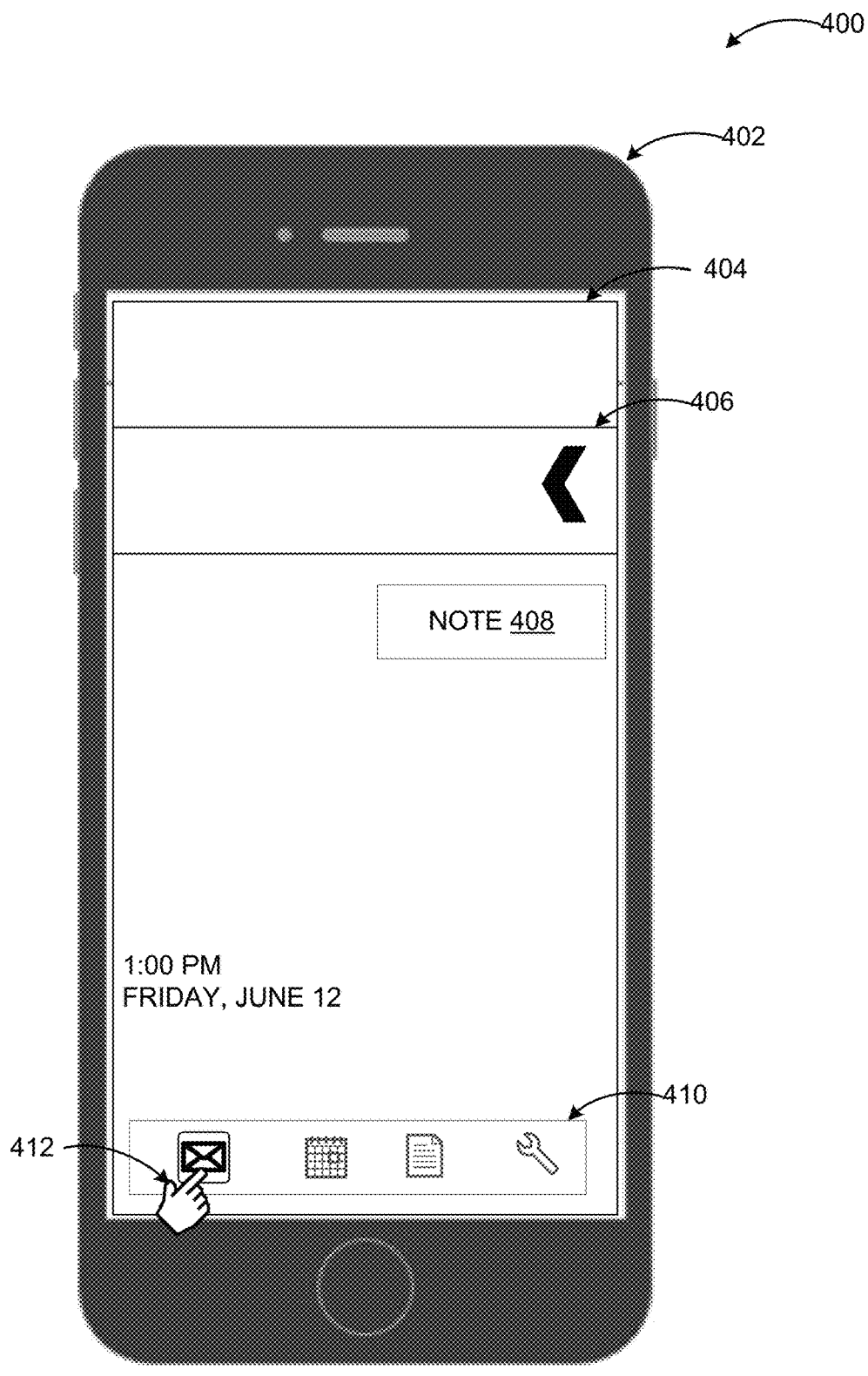
FIG. 4 is a display diagram illustrating a method to transmit a note on a lock screen, according to embodiments.

FIG. 4 is a display diagram illustrating a method to transmit a note on a lock screen, according to embodiments.

In a diagram 400, a computing device 402 may execute a communication application 404. The communication application 404 may include a rendering engine and a note modification engine, among other modules. The computing device 402 may provide the communication application 404 to a participant. The communication application 404 may detect an input action to generate a note 408 on a lock screen 406. In response to the detection of the input action, the communication application 404 may detect another input action on the lock screen 406. The other input action may include a password entered on the lock screen 406. The communication application 404 may, in some examples, receive a notification from an operating system of the computing device 402 that the attempt to unlock the lock screen 406 was successful. In response, the communication application 404 may unlock the lock screen 406. Then, the communication application 404 may provide a note interface to capture the note 408. Once the computing device 402 is unlocked, the communication application 404 may automate further processing steps to save the note 408. The communication application 404 may also sync the note 408 to a server associated with the computing device 402 to enable other applications to access and/or modify the note 408.

The communication application 404 may display a screen 306 on the note interface 304 to capture the note. The communication application 404 may capture the note 408 on the note interface and may save the note 408 at a first storage location. The first storage location may be isolated by the operating system to prevent an execution of a malicious code.

In examples, the communication application 404 may present information associated with the note 408. The information may include a deadline and/or an attachment, among other information. A task may be created based on the deadline, for example. The task may include a "remind to review a day before the deadline," "remind to review an hour before the deadline," or "remind to review ten minutes before the deadline," among other examples. The communication application 404 may detect an input executed on the note 408 to silence the task, mark the task as complete, and/or edit the deadline associated with the task. The communication application 404 may distinguish the information with a textual scheme, a graphical scheme, an audio scheme, an animation scheme, a coloring scheme, a highlighting scheme, and/or a shading scheme, among others.

In a system according to embodiments, application functionality may remain enabled such that the participant may access and control the note 408, the information, attributes extracted from the note 408, and the tasks associated with the note 408. In examples, the communication application 404 may include controls 410 (graphical and/or textual control elements) to allow the participant to perform actions on a selected note. The actions may include editing and copying the note 408, the information, the attributes, and the tasks. As updates and modifications are made to the note 408, the information, the attributes, and the tasks, the updates may be transmitted to a communication data store.

In other examples, the communication application 404 may parse the note 408 to detect default attributes of the note 408. The default attributes may include a source participant and/or a subject matter associated with the note 408, among others. The communication application 404 may receive a transmission input 412 detected on the lock screen 406 to transmit the note 408 to a second storage location. The transmission input 412, in some examples, may be detected on the controls 410. The second storage location may include a communications folder of the source participant, an email address associated with a target participant, and/or an online calendar invite associated with the target participant, among others. In other examples, the second storage location may include a destination for a group (e.g. the source participant, the target participant, and another participant). The note 408 may be transmitted to the second storage location.

In another example, the communication application 404 may parse the note 408 to detect social networking attributes of the note 408. The social networking attributes may include groups participated in by the source participant and/or organizations supported by the source participant, among others. The communication application 404 may receive the transmission input 412 detected on lock screen to transmit the note 408 to the second storage location. The second storage location may include a social networking site associated with the source participant, for example. The note 408 may be transmitted to the second storage location.

In a further example, the communication application 404 may parse the note 408 to detect professional networking attributes of the note 408. The professional networking attributes may include a job title, an education, and/or work-related experience associated with the source participant, among others. The communication application 404 may receive the transmission input 412 detected on the lock screen to transmit the note 408 to the second storage location. The second storage location may include a professional networking site associated with the source participant, for example. The note 408 may be transmitted to the second storage location.

In some examples, the parsed default attributes, the parsed social networking attributes, and the parsed professional networking attributes associated with the note 408 may be listed in a first status column hierarchically distinguished from the sub-attributes in the same column. The first status column, the second status column, and the third status column may be determined based on a selection by the participant of predefined categories or by a participant definition for the categories. An automatic mapping may be performed to translate the attribute fields to the status columns.

In other examples, the mapping of the attributes from attribute fields to the columns in the note interface may occur through a predefined or participant-specific filter. The predefined or participant-specific filter may include rules. A rule may indicate, "place attributes with a deadline this month in the first column." An algorithm facilitating the transformation may evaluate each attribute to determine the column the attribute fits in based on the filter (rule or combination of rules). In response to the evaluation of the attributes, the communication application 404 may move the attributes to the respective column.

The fields and values associated with the attributes may be displayed visually on the note interface. In some examples, the attributes may be displayed using graphical objects and/or textual identification. A coloring scheme or shading scheme may be employed to further identify the sub-attributes. Some or all of the displayed elements on the note interface may be actionable. For example, the communication application 404 may provide links to the controls 410 associated with setting parameters and/or modifying parameters of the attributes. In some examples, the links may be associated with modifying view settings of the note 408 and/or the attributes on the note interface.

In other examples, the communication application 404 may parse the note 408 to detect the professional networking attributes and the social networking attributes of the note 408. The communication application 404 may assign a first weighted value to the professional networking attributes and may assign a second weighted value to the social networking attributes. The communication application 404 may perform a comparison between the first weighted value and the second weighted value.

For example, the communication application 404 may assign a weighted value of one a source participant attribute associated with the note 408, a weighted value of two to a subject matter attribute associated with the note 408, a weighted value of three to a priority attribute associated with the note 408, a weighted value of four to a deadline attribute associated with the note 408, a weighted value of five to a job title attribute associated with the note 408, and a weighted value of six to an organizational attribute supported by the source participant. In examples, the first weighted value may include the source participant attribute and the job title attribute, totaling a weighted value of six. In another example, the second weighted value may include the source participant attribute, the priority attribute, and the organizational attribute supported by the source participant totaling a weighted value of ten. In this example, the second weighted value is larger than the first weighted value, making the second weighted value more significant than the first weighted value.

In an example, the communication application 404 may determine the first weighted value as being larger than the second weighted value. The communication application 404 may receive the transmission input 412 detected on the lock screen to transmit the note 408 to the second storage location. The second storage location may include the professional networking site associated with the source participant. The note 408 may be transmitted to the second storage location.

In another example, the communication application 404 may determine the first weighted value as being less than the second weighted value. The communication application 404 may receive the transmission input 412 detected on the lock screen to transmit the note 408 to the second storage location. The second storage location may include the social networking site associated with the source participant. The note 408 may be transmitted to the second storage location.

In a further example, the communication application 404 may determine the first weighted value as being equal to the second weighted value. The communication application 404 may receive the transmission input 412 detected on the lock screen to transmit the note 408 to the second storage location. The second storage location may include the social networking site associated with the source participant. The note 408 may be transmitted to the second storage location. The communication application 404 may receive another transmission input detected on the lock screen to transmit the note to a third storage location. The third storage location may include the professional networking site associated with the source participant. The note 408 may also be transmitted to the third storage location.

In another example, the communication application 404 may parse the note 408 to detect the default attributes, the professional networking attributes, and the social networking attributes of the note 408. The communication application 404 may determine the first weighted value associated with the default attributes, the second weighted value associated with the professional networking attributes, and a third weighted value associated with the social networking attributes. The communication application 404 may also order the default attributes, the professional networking attributes, and the social networking attributes based on the first weighted value, the second weighted value, and the third weighted value. The ordering may include an ascending order or a descending order, among others.

In a further example, the communication application 404 may detect a customization input of the first weighted value, the second weighted value, and/or the third weighted value. Execution of the customization input may disorder the ordering of the first weighted value, the second weighted value, and the third weighted value. The communication application 404 may re-order the default attributes, the professional networking attributes, and the social networking attributes based on the customization input. In other examples, the first weighted value and the second weighted value may be modified in response to receiving participant-defined criteria. For example, the modification may edit the weighted value of the source participant attribute based on an identification of the source participant. For example, the modification may edit the weighted value of one to a weighted value of four for the source participant identified as a boss, whereas the weighted value of one for the source participant identified as a co-worker may be maintained.

In further examples, the first weighted value, the second weighted value, and the third weighted value may be determined by using one or more algorithms (e.g. a weighted majority algorithm, an algorithm implementing a nearest neighbor method, a label dependent feature weighing algorithm, a randomized weighted majority algorithm, a learning algorithm, etc.). The learning algorithm may analyze a history of assigned weighted values during a first time period to determine the first weighted value, the second weighted value, and the third weighted value during a second time period.

In some examples, the communication application 404 may perform a comparison between the first weighted value, the second weighted value, and the third weighted value. The communication application 404 may, for example, determine the first weighted value as being larger than the second weighted value. The communication application 404 may receive the transmission input 412 to transmit the note 408 to a second storage location associated with the first weighted value. The second storage location may include a communications folder of the source participant, an email address associated with the target participant, and/or an online calendar invite associated with the target participant, among others. The note 408 may be transmitted to the second storage location.

The example scenarios and schemas in FIG. 1 through FIG. 4 are shown with specific components, data types, and configurations. Embodiments are not limited to systems according to these example configurations. Creating a note on a lock screen may be implemented in configurations employing fewer or additional components in applications and user interfaces. Furthermore, the example schema and components shown in FIG. 1 through FIG. 4 and their subcomponents may be implemented in a similar manner with other values using the principles described herein.

Figure 5:
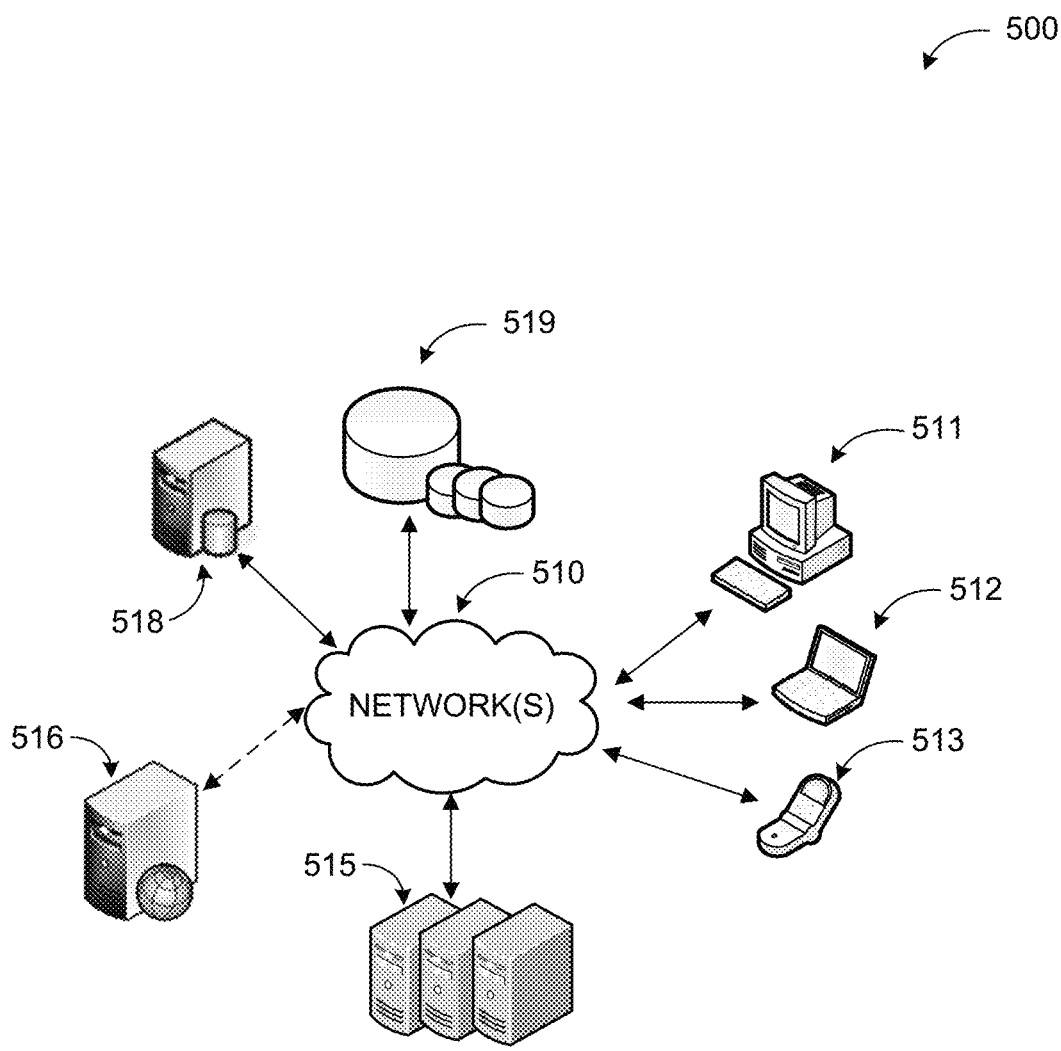
FIG. 5 is a simplified networked environment, where a system according to embodiments may be implemented.

FIG. 5 is a simplified networked environment, where a system according to embodiments may be implemented.

As shown in a diagram 500, notes may be captured on a note interface of a computing device. The computing device may execute a communication application. In examples, a communication service may be implemented via software executed over the servers 514. The platform may communicate with client applications on individual computing devices such as a smart phone 513, a mobile computer 512, or desktop computer 511 ('client devices') through network(s) 510. The servers 514 may include one or more communication servers 516, where at least one of the one or more communication servers 516 may be configured to execute one or more applications (i.e. the communication application) associated with a communication service.

In other examples, the communication service may be provided by a third party service or may include a web application. The communication service may store data associated with note data in a data store 519 directly or through a database server 518. Client applications executed on client devices 511-513 may be enabled to receive the note data and render the note interface displaying information associated with captured notes.

Client applications executed on any of the client devices 511-513 may facilitate communications via application(s) executed by the one or more communication servers 516, or on an individual communication server. An application, such as the communication application, may detect an input to generate a note on the lock screen. The communication application may provide a note interface to capture the note. Once the note is captured on the note interface, the communication application may save the note at a first storage location. The first storage location may be isolated by an operating system of the computing device to prevent an execution of a malicious code. The communication application may store the note data associated with the notes in the data store 519 directly or through database server 518.

The network(s) 510 may comprise any topology of servers, clients, Internet service providers, and communication media. A system according to embodiments may have a static or dynamic topology. The network(s) 510 may include secure networks such as an enterprise network, an unsecure network such as a wireless open network, or the Internet. The network(s) 510 may also coordinate communication over other networks such as Public Switched Telephone Network (PSTN) or cellular networks. Furthermore, the network(s) 510 may include short range wireless networks such as Bluetooth or similar ones. The network(s) 510 provide communication between the nodes described herein. By way of example, and not limitation, the network(s) 510 may include wireless media such as acoustic, RF, infrared and other wireless media.

A textual scheme, a graphical scheme, an audio scheme, an animation scheme, a coloring scheme, a highlighting scheme, and/or a shading scheme may be employed to further enhance participant interaction between information associated with the notes and the note interface.

Many other configurations of computing devices, applications, data sources, and data distribution systems may be employed for creating a note on a lock screen. Furthermore, the networked environments discussed in FIG. 5 are for illustration purposes only. Embodiments are not limited to the example applications, modules, or processes.

Figure 6:
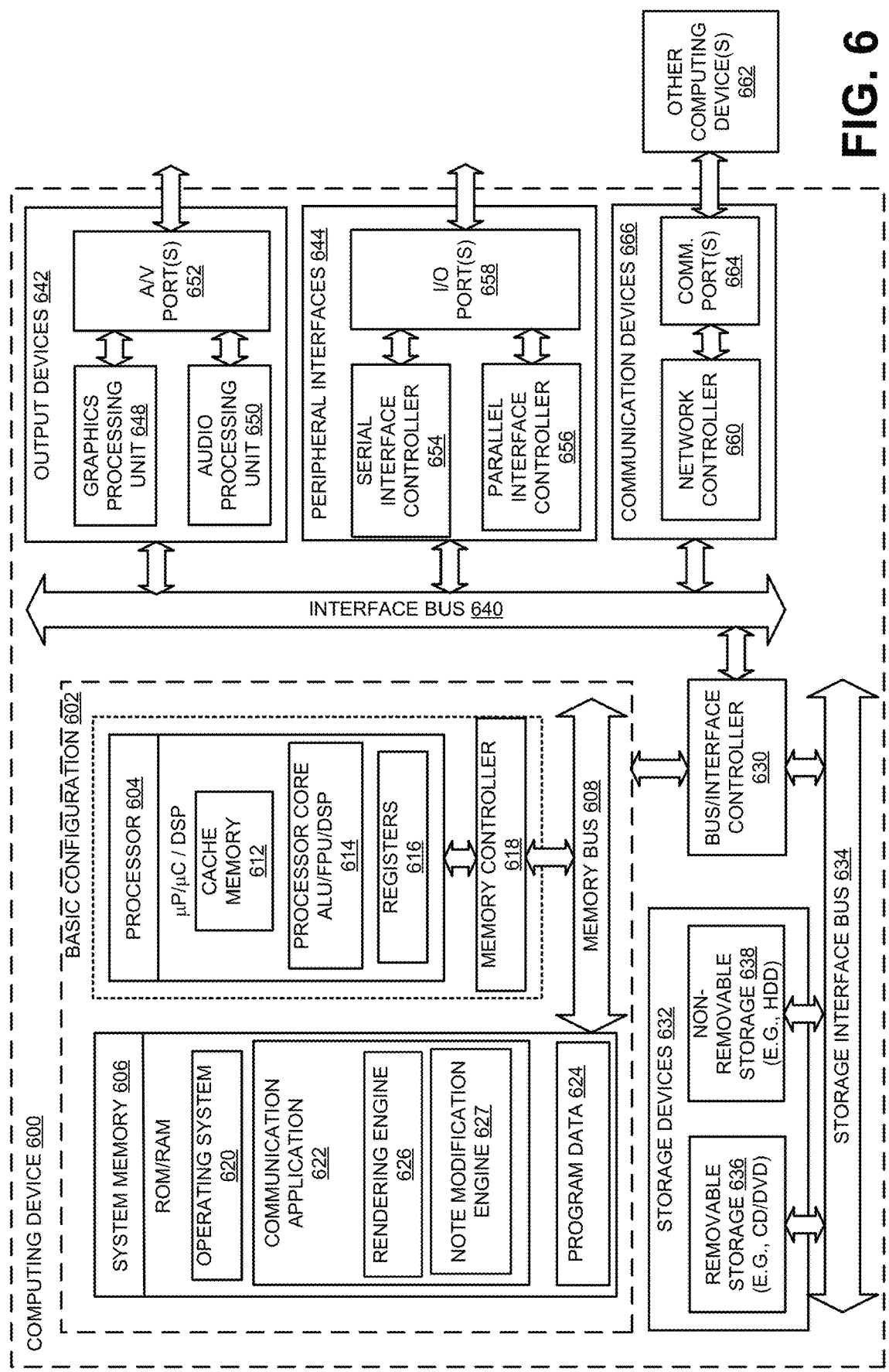
FIG. 6 is a block diagram of an example computing device, which may be used for creating a note on a lock screen, according to embodiments.

FIG. 6 is a block diagram of an example computing device, which may be used for creating a note on a lock screen, according to embodiments.

For example, a computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication application 622, and a program data 624. The communication application 622 may include a rendering engine 626 and a note modification engine 627. The rendering engine 626 may detect an input to generate a note on the lock screen and may provide a note interface to capture the note. The rendering engine 626 may also present information associated with the note. The information may include a deadline and/or an attachment, among other examples. The rendering engine 626 may distinguish the information with a textual scheme, a graphical scheme, an audio scheme, an animation scheme, a coloring scheme, a highlighting scheme, and/or a shading scheme, among other schemes. The note modification engine 627 may capture the note on the note interface and may save the note at a first storage location. The first storage location may be isolated by an operating system of the computing device to prevent an execution of a malicious code. The note modification engine 627 may parse the note to detect default attributes of the note. The default attributes may include a source participant and a subject matter associated with the note, among others. The note modification engine 627 may receive a transmission input detected on the lock screen to transmit the note to a second storage location. The second storage location may include a communications folder of the source participant, an email address associated with a target participant, and an online calendar invite associated with the target participant, among others. In response to receiving the transmission input, the note modification engine 627 may transmit the note to the second storage location.

Components of the communication application 622 (such as the note interface) may also be displayed on the display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a note interface of the communication application 622, displayed by the touch based device. The program data 624 may also include, among other data, note data and information related to the notes, or the like, as described herein.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the example basic configuration 602 via the bus/interface controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods for creating a note on a lock screen. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
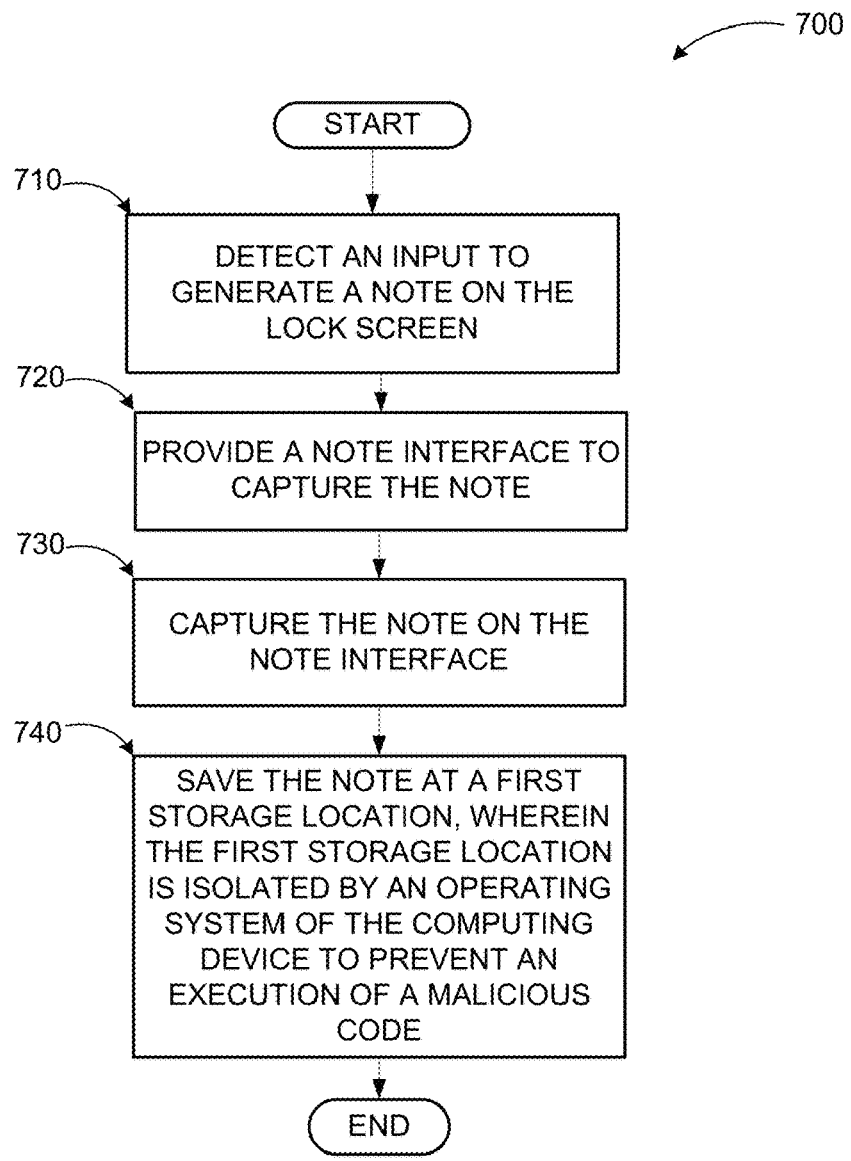
FIG. 7 is a logic flow diagram illustrating a process for creating a note on a lock screen, according to embodiments.

FIG. 7 is a logic flow diagram illustrating a process for creating a note on a lock screen, according to embodiments.

A process 700 may be implemented on a computing device, such as the computing device 600, or with another system. As described, a participant may be allowed to interact with a communication application through an input device or a touch enabled display component of the computing device 600. The computing device 600 may provide a note interface of the communication application to the participant.

The process 700 begins with operation 710, where the communication application may detect an input to generate a note on the lock screen. The input may include a press and hold action, a press and hold action combined with a swipe action, the swipe action, a keyboard entry combination, a hovering action by a mouse input, a press and hold action and a hovering action by a pen input, a tap action, an accelerometer sensor based input, an orientation sensor based input, an optically captured gesture, and/or a time based input, among other examples.

At operation 720, the communication application may provide a note interface to capture the note. At operation 730, the communication application may capture the note on the note interface. The communication application may present information associated with the note. The information may include a deadline and/or an attachment, among other examples. The communication application may also distinguish the information with a textual scheme, a graphical scheme, an audio scheme, an animation scheme, a coloring scheme, a highlighting scheme, and/or a shading scheme, among other examples. The communication application may detect a modification input executed on the note interface to modify the information associated with the note. The information may be modified based on the modification input.

At operation 740, the communication application may save the note at a first storage location. The first storage location may be isolated by an operating system of the computing device to prevent an execution of a malicious code. In some examples, the communication application may parse the note to detect default attributes of the note. The default attributes may include a source participant and a subject matter associated with the note, among others. The communication application may receive a transmission input detected on the lock screen to transmit the note to a second storage location. The second storage location may include a communications folder of the source participant, an email address associated with a target participant, and/or an online calendar invite associated with the target participant, among others. The note may be transmitted to the second storage location.

The operations included in process 700 are for illustration purposes. Creating a note on a lock screen may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means for creating a note on a lock screen is described, which may include a means for detecting an input to generate a note on the lock screen, a means for providing a note interface to capture the note, a means for capturing the note on the note interface, and a means for saving the note at a first storage location. The first storage location may be isolated by an operating system of the computing device to prevent an execution of a malicious code.

According to some embodiments, computing devices for creating a note on a lock screen are described. An example computing device may include a display device, a memory, and processors coupled to the memory and the display device. The processors may execute a communication application in conjunction with instructions stored in the memory. The communication application may include a rendering engine and a note modification engine. The rendering engine may be configured to detect an input to generate a note on the lock screen and provide, on the display device, a note interface to capture the note. The note modification engine may be configured to capture the note on the note interface and save the note at a first storage location. The first storage location may be isolated by an operating system of the computing device to prevent an execution of a malicious code.

According to additional embodiments, the rendering engine may be further configured to present information associated with the note and distinguish the information with a textual scheme, a graphical scheme, an audio scheme, an animation scheme, a coloring scheme, a highlighting scheme, and/or a shading scheme. The information may include a deadline and/or an attachment. In additional examples, the rendering engine may be further configured to detect a modification input executed on the note interface to modify the information associated with the note and provide the modification input to the note modification engine to prompt the note modification engine to modify the information based on the modification input.

According to some embodiments, the note modification engine may be further configured to parse the note to detect default attributes of the note, receive a transmission input detected on the lock screen to transmit the note to a second storage location, and transmit the note to the second storage location. The default attributes may include a source participant and/or a subject matter associated with the note, among others. The second storage location may include a communications folder of the source participant, an email address associated with a target participant, and/or an online calendar invite associated with the target participant, among others.

According to additional embodiments, the note modification engine may be further configured to parse the note to detect social networking attributes of the note, receive a transmission input detected on the display device to transmit the note to a second storage location, and transmit the note to the second storage location. The social networking attributes may include groups participated in by a source participant and/or organizations supported by the source participant. The second storage location may include a social networking site associated with the source participant.

According to some embodiments, the note modification engine may be further configured to parse the note to detect professional networking attributes of the note, receive a transmission input detected on the display device to transmit the note to a second storage location, and transmit the note to the second storage location. The professional networking attributes may include a job title, an education, and/or work-related experience associated with a source participant, among others. The second storage location may include, for example, a professional networking site associated with the source participant.

According to other examples, the note modification engine may be further configured to parse the note to detect professional networking attributes and social networking attributes of the note, assign a first weighted value to the professional networking attributes, assign a second weighted value to the social networking attributes, and perform a comparison between the first weighted value and the second weighted value.

In some examples, the note modification engine may be further configured to determine the first weighted value as being larger than the second weighted value. In response, the note modification engine may receive a transmission input detected on the display device to transmit the note to a second storage location. The note may be transmitted to the second storage location. The second storage location may include, for example, a professional networking site associated with a source participant.

In other examples, the note modification engine may be further configured to determine the first weighted value as being less than the second weighted value. In response, the note modification engine may receive a transmission input detected on the display device to transmit the note to a second storage location. The note may be transmitted to the second storage location. The second storage location may include, for example, a social networking site associated with a source participant.

According to additional examples, the note modification engine may be further configured to determine the first weighted value as being equal to the second weighted value. In response, the note modification engine may receive a transmission input detected on the display device to transmit the note to a second storage location. The note may be transmitted to the second storage location. The note modification engine may receive another transmission input detected on the display device to transmit the note to a third storage location. In response, the note modification engine may transmit the note to the third storage location. The second storage location may include, for example, a social networking site associated with a source participant. The third storage location may include, for example, a professional networking site associated with the source participant.

According to some embodiments, methods executed on a computing device for creating a note on a lock screen may be provided. An example method may include process steps, such as, detecting an input to generate a note on the lock screen, providing a note interface to capture the note, capturing the note on the note interface, and saving the note at a first storage location. The first storage location may be isolated by an operating system of the computing device to prevent an execution of a malicious code.

According to other embodiments, the method may further include steps for parsing the note to detect default attributes, professional networking attributes, and social networking attributes of the note and determining a first weighted value associated with the default attributes, a second weighted value associated with the professional networking attributes, and a third weighted value associated with the social networking attributes.

According to some embodiments, the method may further include additional steps for ordering the default attributes, the professional networking attributes, and the social networking attributes based on the first weighted value, the second weighted value, and the third weighted value. The ordering may include an ascending order or a descending order. The method may further include additional steps for detecting a customization input of the first weighted value, the second weighted value, and/or the third weighted value, and re-ordering the default attributes, the professional networking attributes, and/or the social networking attributes based on the customization input.

According to other examples, the method may further include additional steps for performing a comparison between the first weighted value, the second weighted value, and the third weighted value. In response to the comparison, the method may further include additional steps for determining the first weighted value as being larger than the second weighted value. In response, the note may be transmitted to a second storage location associated with the first weighted value. The second storage location may include a communications folder of the source participant, an email address associated with a target participant, and/or an online calendar invite associated with the target participant. In examples, the input may include a press and hold action, a press and hold action combined with a swipe action, the swipe action, a keyboard entry combination, a hovering action by a mouse input, a press and hold action and a hovering action by a pen input, a tap action, an accelerometer sensor based input, an orientation sensor based input, an optically captured gesture, and/or a time based input, among others.

According to some examples, computer-readable memory devices with instructions stored thereon for creating a note on a lock screen may be provided. An example computer-readable memory device with instructions stored thereon for creating a note on a lock screen may include detecting an input to generate a note on the lock screen, providing a note interface to capture the note, capturing the note on the note interface, and saving the note at a first storage location. The first storage location may be isolated by an operating system of the computing device to prevent an execution of a malicious code.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for creating a note on a lock screen, the computing device comprising:
   a memory; and
   one or more processors coupled to the memory, wherein the one or more processors in conjunction with instructions stored in the memory are configured to:
      detect an input to generate a note on the lock screen, the lock screen including a user interface element configured to regulate access to the computing device and to require performance of an action in order to allow access to the computing device;

in response to detecting the input to generate the note, cause a note interface to be presented on the lock screen to capture the note;

capture the note on the note interface, save the note at a first storage location;

cause creation of a task based on information associated with the note;

cause a reminder associated with the task to be presented on the note interface; and in response to receiving input through the note interface associated with the task, cause performance of at least one of marking the task complete and silencing the reminder.

2. The computing device of claim 1, wherein the one or more processors are further configured to:

cause the information associated with the note to be presented, wherein the information includes an attachment; and cause the information as presented to be marked using at least one selected from a group consisting of a textual scheme, a graphical scheme, an audio scheme, an animation scheme, a coloring scheme, a highlighting scheme, and a shading scheme.

3. The computing device of claim 2, wherein the one or more processors are further configured to:

in response to receiving second input modifying the information associated with the note, causing the information as presented to be modified based on the second input.

4. The computing device of claim 1, wherein the one or more processors are further configured to:

parse the note to detect a default attribute of the note, the default attribute including at least one selected from a group consisting of a source participant and a subject matter associated with the note; and in response to receiving second input to transmit the note, cause the note to be transmitted to a second storage location, the second storage location including at least one selected from a group consisting of a communications folder of the source participant, an email address associated with a target participant, and an online calendar invite associated with the target participant.

5. The computing device of claim 1, wherein the one or more processors are further configured to:

parse the note to detect a social networking attribute of the note, the social networking attribute including at least one selected from a group consisting of a group participated in by a source participant and an organization supported by the source participant; and in response to receiving second input to transmit the note to a second storage location, cause the note to be transmitted to the second storage location, the second storage location including a social networking site associated with the source participant.

6. The computing device of claim 1, wherein the one or more processors are further configured to:

parse the note to detect a professional networking attribute of the note, wherein the professional networking attribute includes at least one selected from a group consisting of a job title associated with a source participant, an education associated with the source participant, and work-related experience associated with the source participant; and in response to receiving a second input to transmit the note to a second storage location, cause the note to be transmitted to the second storage location, the second storage location including a professional networking site associated with the source participant.

7. The computing device of claim 1, wherein the one or more processors are further configured to:

determine a first weighted value associated with a default attribute of the note, a second weighted value associated with a professional networking attribute of the note, and a third weighted value associated with a social networking attribute of the note; and in response to receiving second input to transmit the note to a second storage location, cause the note to be transmitted to the second storage location, the second storage location including a professional networking site associated with a source participant in response to the second weighted value being larger than the third weighted value.

8. The computing device of claim 1, wherein the one or more processors are further configured to:

determine a first weighted value associated with a default attribute of the note, a second weighted value associated with a professional networking attribute of the note, and a third weighted value associated with a social networking attribute of the note; and in response to receiving second input to transmit the note to a second storage location, cause the note to be transmitted to the second storage location, the second storage location including a social networking site associated with a source participant in response to the second weighted value being less than the third weighted value.

9. The computing device of claim 1, wherein the one or more processors are further configured to:

determine a first weighted value associated with a default attribute of the note, a second weighted value associated with a professional networking attribute of the note, and a third weighted value associated with a social networking attribute of the note; and in response to receiving second input to transmit the note to a second storage location, cause the note to be transmitted to a professional networking site associated with a source participant and to a social networking site associated with the source participant in response to the second weighted value being equal to the third weighted value.

10. A method executed on a computing device for creating a note on a lock screen, the method comprising:

detecting an input to generate a note on the lock screen, the lock screen including a user interface element configured to regulate access to the computing device and to require performance of an action in order to allow access to the computing device;

in response to detecting the input to generate the note, causing a note interface to be presented on the lock screen to capture the note;

capturing the note on the note interface;

saving the note at a first storage location;

causing creation of a task based on information associated with the note;

causing a reminder associated with the task to be presented on the note interface; and in response to receiving input through the note interface associated with the task, causing performance of at least one of marking the task complete and silencing the reminder.

11. The method of claim 10, further comprising:
parsing the note to detect a default attribute of the note, a professional networking attribute of the note, and a social networking attribute of the note; and
determining a first weighted value associated with the default attribute, a second weighted value associated with the professional networking attribute, and a third weighted value associated with the social networking attribute.

12. The method of claim 11, further comprising:
ordering the default attribute, the professional networking attribute, and the social networking attribute based on the first weighted value, the second weighted value, and the third weighted value, the ordering including one selected from a group consisting of an ascending order and a descending order.

13. The method of claim 12, further comprising:
detecting a second input customizing at least one selected from a group consisting of the first weighted value, the second weighted value, and the third weighted value; and
re-ordering the default attribute, the professional networking attribute, and the social networking attribute based on the second input.

14. The method of claim 11, further comprising:
performing a comparison between the first weighted value, the second weighted value, and the third weighted value.

15. The method of claim 14, further comprising:
in response to performing the comparison, causing the note to be transmitted to at least one selected from a group consisting of a communications folder of a source participant, an email address associated with a target participant, and an online calendar invite associated with the target participant in response to the first weighted value as being larger than the second weighted value.

16. The method of claim 10, wherein the input includes at least one selected from a group consisting of a press and hold action, a press and hold action combined with a swipe action, the swipe action, a keyboard entry combination, a hovering action by a mouse input, a press and hold action and a hovering action by a pen input, a tap action, an accelerometer sensor based input, an orientation sensor based input, an optically captured gesture, and a time based input.

17. A computer-readable memory device with instructions stored thereon for creating a note on a lock screen of a computing device, the instructions comprising:
detecting an input to generate a note on the lock screen, the lock screen including a user interface element configured to regulate access to the computing device and to require performance of an action in order to allow access to the computing device;
in response to detecting the input to generate the note, causing a note interface to be presented on the lock screen to capture the note;
capturing the note on the note interface;
saving the note at a first storage location;
causing creation of a task based on information associated with the note;
causing a reminder associated with the task to be presented on the note interface; and
in response to receiving input through the note interface associated with the task, causing performance of at least one of marking the task complete and silencing the reminder.

18. The computer-readable memory device of claim 17, wherein the instructions further comprise:
ordering a default attribute, a professional networking attribute, and a social networking attribute based on a first weighted value, a second weighted value, and a third weighted value, the ordering includes one selected from a group consisting of an ascending order and a descending order.

19. The computer-readable memory device of claim 18, wherein the instructions further comprise:
detecting a second input customizing at least one selected from a group consisting of the first weighted value, the second weighted value, and the third weighted value; and
re-ordering the default attribute, the professional networking attribute, and the social networking attribute based on the second input.

20. The computer-readable memory device of claim 17, further comprising receiving the input through the note interface includes receiving the input associated with the note as presented through the note interface.

* * * * *